March 4, 1952 — H. H. EVERHARD — 2,588,224
THERMOSTATIC CONTROL DEVICE
Filed June 28, 1949
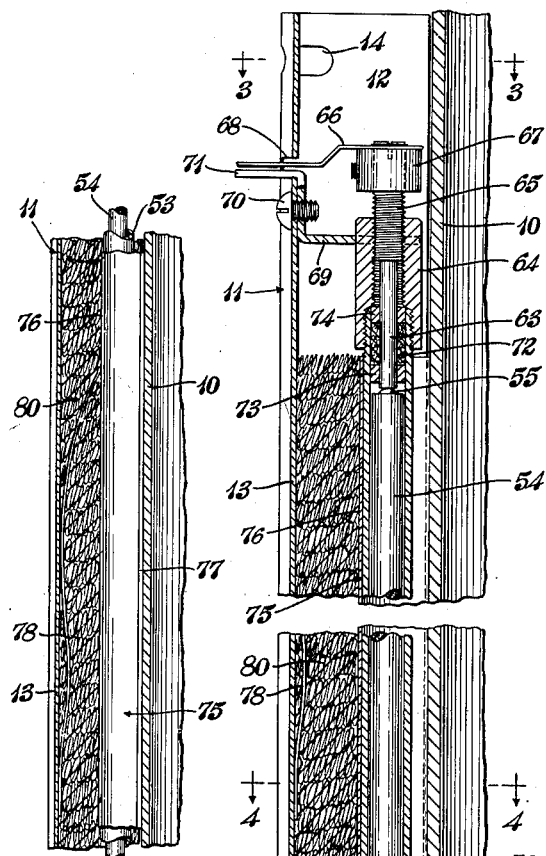
Fig. 2
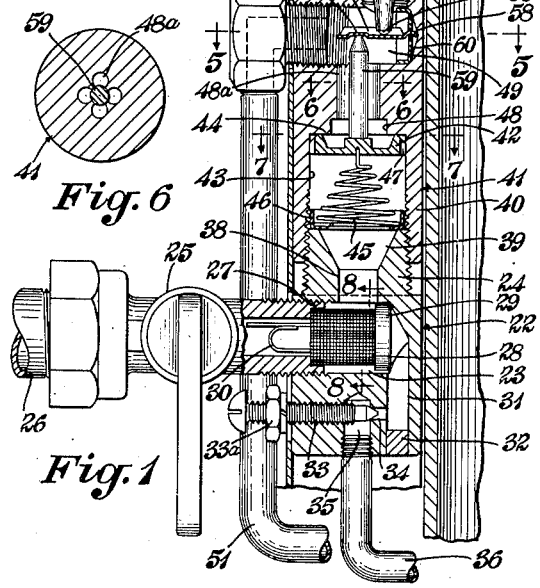
Fig. 6
Fig. 1
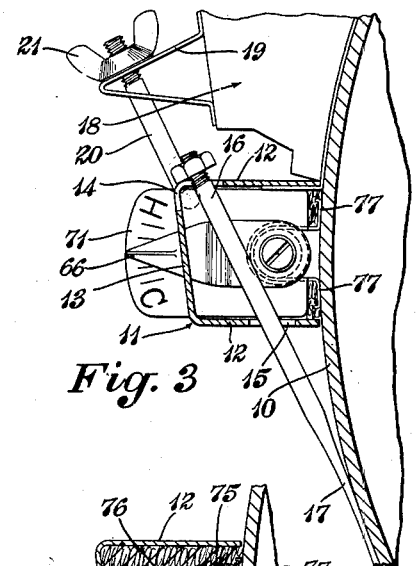
Fig. 3
Fig. 4
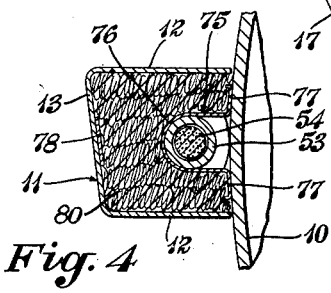
Fig. 5
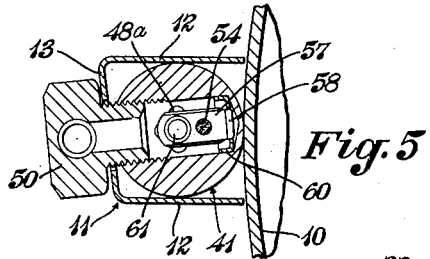
Fig. 7   Fig. 8
INVENTOR.
Harry H. Everhard
BY
Frease and Bishop
ATTORNEYS Patented Mar. 4, 1952

2,588,224

UNITED STATES PATENT OFFICE 2,588,224

THERMOSTATIC CONTROL DEVICE

Harry H. Everhard, Canton, Ohio

Application June 28, 1949, Serial No. 101,820

2 Claims. (Cl. 236—33)

The invention relates generally to thermostatic controls for automatically regulating burners heating fluid tanks or reservoirs, and more particularly to thermostatic control devices for hot water heaters, and especially adapted for domestic hot water heaters including the type shown in my prior Patent No. 2,098,489, issued November 9, 1937.

Certain prior thermostatic control devices for this purpose are complicated and relatively expensive, and are designed especially to be used with only one particular type of automatic heater. Moreover, these prior devices include as a thermostatic element an expansible tube which projects radially into the hot water tank through a tapped pole normally provided in standard cylindrical hot water boilers. The expansible tube cannot be inserted diametrically into such a standard boiler until the vertical filler pipe located in the center of the boiler is removed and bent or offset to pass around the thermostatic tube. This operation involves additional trouble and expense in the installation of the thermostatic control device.

With these prior devices, the expansible tube is usually copper because of the necessity to minimize corrosion, but copper has a relatively small coefficient of expansion, so that a limited amount of linear expansion of the tube is obtained with which to regulate the operation of the fuel valve which supplies the burners. As a result, the control of the burner is difficult to maintain accurately within the critical temperature range and the fuel valve must be designed so as to have a relatively large effective area for transmitting sufficient fuel with a very small opening movement of the valve.

Accordingly, such prior thermostatic controls require relatively large parts, some of which are usually castings, and the control devices are consequently relatively large and heavy, and expensive to manufacture.

It is an object of the present invention to provide a novel thermostatic control device which is extremely small and compact in construction, and inexpensive to manufacture and install.

Another object is to provide a novel thermostatic control device which is adapted to be used with various types and sizes of hot water tanks and heaters.

Another object is to provide a novel thermostatic control device which is mounted entirely on the outside of the heater tank, making it easy to install.

Another object is to provide a novel thermostatic control device having an elongated brass tube located adjacent to the exterior of the water tank, for obtaining greater expansibility.

A further object is to provide novel lever means for multiplying the effect of the expansible element.

Another object is to provide a novel thermostatic control device which gives greater accuracy of control within the critical temperature range.

A still further object is to provide a novel thermostatic control device which utilizes a relatively small fuel valve and related parts.

Finally, it is an object of the present invention to provide a simple, compact and inexpensive thermostatic control device in which parts are substantially all made from standard tube and bar stock without requiring any castings.

These and other objects are accomplished by the parts, elements, arrangements and combinations comprising the present invention, a preferred embodiment of which is illustrated by way of example in the accompanying drawing as exemplifying the best known mode of carrying out the invention, said preferred embodiment being described in detail in the following specification, and the scope of the invention being defined in the appended claims.

In general terms, the invention may be set forth as including a self-contained thermostatic control device positioned within a channel-shaped housing adapted to be mounted alongside a water tank, there being an elongated expansible brass tube in the housing insulated therefrom and in heat-conducting relation to the tank, with a carbon rod slidable in the tube and operating a third-class lever fulcrumed in a tubular valve housing secured to one end of the expansible tube, said lever being arranged to actuate an axial pin for opening and closing a spring pressed fuel valve in said fuel valve housing, and a tubular fuel supply housing connected to said fuel valve housing and having a pilot supply passageway leading therefrom and a regulating valve in said passageway.

Referring to the drawing in which a preferred embodiment of the invention is shown by way of example:

Figure 1 is a vertical sectional view, with parts broken away, of the novel thermostatic control device applied to the side of a hot water tank.

Fig. 2 is a similar fragmentary view on a reduced scale, showing the manner of holding the expansible thermostatic tube in heat-conducting relation to the tank wall;

Fig. 3 is a plan sectional view as on line 3—3,

Fig. 1, showing the manner of mounting the thermostatic control device on a tank wall in conjunction with a hot water heater applied to the side of the water tank;

Fig. 4 is a transverse sectional view as on line 4—4, Fig. 1;

Fig. 5 is a transverse sectional view as on line 5—5, Fig. 1;

Fig. 6 is a fragmentary cross sectional view as on line 6—6, Fig. 1;

Fig. 7 is a fragmentary cross sectional view as on line 7—7, Fig. 1; and

Fig. 8 is an enlarged fragmentary sectional view as on line 8—8, Fig. 1.

Similar numerals refer to similar parts throughout the several views of the drawing.

An ordinary cylindrical hot water tank or boiler is indicated fragmentarily at 10, and the novel thermostatic control device comprising the present invention is shown in a vertically disposed position alongside the exterior of the cylindrical tank wall. As indicated in Fig. 3, the invention is shown in connection with a hot water heater attached to the side of the tank for heating the tank wall, such as shown in my Patent No. 2,098,489. However, it will be understood that the invention may be utilized in connection with other types of hot water heaters.

In the embodiment shown, the thermostatic control device is mounted within a channel-shaped housing indicated generally at 11, having two parallel legs 12 extending substantially radially outward from the tank wall 10 and connected at their outer ends by a web 13. At suitable locations, slots 14 are provided in one corner of the channel 11, and holes 15 are formed in the opposite leg 12 so that clamping bolts 16 can extend across the channel member 11. The clamping bolts 16 are each connected as by welding to a strap 17 which encircles the tank 10 and is connected to a similar bolt 16 and channel 11 on the opposite side of the tank.

Between these two opposite channels 11 is mounted the insulated sheet metal shell or jacket indicated generally at 18 within which is located the combustion chamber of the heater, and the jacket 18 is provided with notched brackets 19. Bolts 20 having wing nuts 21 are used to connect the brackets 19 to the channels 11, as indicated in Fig. 3, so that the shell 18 of the heater is tightly clamped against the side wall of the tank.

In this embodiment, one of the channels 11 serves as the housing for the self-contained thermostatic control device comprising the present invention, but it is obvious that in applying the invention to other types of heaters, the shape and dimensions of the housing may be modified.

Referring to Fig. 1, the bottom section of the control device is indicated generally at 22 and may be described as a tubular housing for the fuel supply chamber 23. Preferably the housing 22 is made from a piece of standard brass bar stock, and is provided at its upper end with a threaded portion 24 for attachment to the adjoining section of the device. A main supply valve 25 is screwed into the side of the chamber 23 for supplying fuel such as natural or artificial gas to the chamber, and a gas supply line 26 is screwed into the outer end of the valve.

Preferably the inner end of the valve is provided with an internal annular shoulder 27, and a strainer screen 28 is seated at one end within the shoulder 27. The other end of the screen is seated within a cap 29 which abuts the inner wall of the chamber 23 and preferably the screen is crimped radially inwardly into a polygonal shape, as shown in Fig. 8, to increase its effective area. A spring clip 30 is attached at one end to the cap 29 and engages in the bore of the valve 25, for mounting and maintaining the shape of the screen 28 as it is forced into position.

A pilot valve supply duct 31 is drilled longitudinally into the housing 22 from the bottom end into the inner end of the chamber 23, and the bottom end of the duct is plugged as indicated at 32. A screw threaded needle valve 33 is threaded transversely through the housing member 22 and its inner end seats on one end of a port 34 communicating with the duct 31. An axial pilot valve passageway 35 drilled from the bottom of housing member 22 connects with the port 34, so that when the needle valve 33 is opened, gas will flow around the cap 29 into duct 31, and from the duct 31 into the passageway 35 and thence into the pipe 36 which supplies gas to the pilot burner. A lock nut 33a is provided on the needle valve 33 to hold it in adjusted position.

The threaded upper end 24 of the housing 22 is provided with a bore 38 communicating with the fuel supply chamber 23 and preferably having a tapered outlet portion 39 at its upper end. The threaded portion 24 is screwed into the internally threaded lower end 40 of a tubular housing section indicated generally at 41 which contains the fuel supply regulating valve 42. The housing section 41 is preferably made from standard brass bar stock. The regulating valve 42 is positioned in a bore 43 for seating against the shoulder 44 at the top of the bore, and a spiral spring 45 having its upper end axially engaged with the valve 42 normally holds the valve in closed position. The bottom of the spring is preferably seated in an annular cup 46 which abuts the upper end of the housing 22.

Preferably the outer periphery of the valve 42 is provided with slotted portions 47 for allowing passage of the gas around the valve 42 and valve seat 44 when the valve is opened, and thence into the reduced bore 48 which communicates with a clover-leaf bore 48a (Fig. 6) extending into a transverse bore 49 in which is screwed the angular outlet fitting 50, and the main burner supply pipe 51 is connected with the fitting 50 and preferably extends downwardly along the exterior of the channel housing 11. The burner pipe 51 and the pilot burner pipe 36 are preferably made of brass tubing which is easily bent to suitably connect the pipes to their respective burners.

The upper end of the housing member 41 is provided with a vertical threaded bore 52 which communicates with the inner end of the transverse bore 49, and is thus laterally offset from the pin 59. An elongated expansible brass tube 53 is screwed into the vertical bore 52 and extends upwardly adjacent to the tank wall into the upper portion of the channel 11. A non-expansible carbon rod 54 is slidably mounted within the tube 53, and preferably has a rounded metallic contact button 55 at its upper end and a similar button 56 at its lower end, which may be tapered as shown. Preferably the button 56 engages the intermediate portion of a lever 57 which is fulcrumed at one end 58 in the bore 49, and its other end engages an axial pin 59 extending through the bore 48a and abutting the valve 42 at its lower end. The cloverleaf bore 48a provides a series of gas passageways around the pin and ribs between the passageways for guiding the pin. Thus relative movement of the carbon rod 54 with respect to the brass tube 53 and housing member 41 will force the valve 42 downwardly against the spring 45 to open the valve and allow gas to flow through bores 48 and 48a into bore 49.

The lever 57 is preferably made inexpensively from a sheet metal stamping and has flanges at its side edges to strengthen the same. The fulcrum end 58 of the lever is preferably curved upwardly and inserted through a slot in a cup member 60 which is secured in the inner end of the transverse bore 49 with a press fit. The other end of the lever 57 is embossed upwardly at 61 where it abuts the pin 59. Thus, the surfaces of the lever which engage the cup 60, the contact button 56 and the pin 59 are all in the same plane.

The upper end of the carbon rod 54 is adjustably engaged by a pin 63 which extends above the upper end of the brass tube 53 and into a cap member 64 screwed on the tube. Means for adjusting the pin 63 longitudinally of the tube preferably includes a screw 65 which is screwed into the top of the cap 64 and abuts the upper end of the pin 63. A pointer or indicator 66 is secured to the head 67 secured on the screw and extends laterally through a slot 68 in the leg 13 of the channel 11. A bracket member 69 is preferably secured to the web 13 of the housing channel by a screw 70, and one end of the bracket is engaged around the cap 64 to support the same, while the other end 71 extends angularly outwardly through the slot 68 and is provided with a scale for cooperating with the pointer 66 in adjusting the thermostatic control device to change its critical temperature.

Packing means is provided around the pin 63 to prevent leakage of gas which passes from the transverse bore 49 upwardly through the brass tube 53. This packing means preferably includes graphite packing 72 which is compressed between two bushings 73 and 74 within the upper end of the tube when the cap 64 is screwed thereon.

The means for conducting heat from the tank wall 10 to the expansible tube 53, preferably comprises a strip 75 which preferably is formed of thin sheet brass and has a winged U-shape in cross section. The closed portion 76 of the U fits closely around the expansible tube 53, as best shown in Fig. 4, and the wing portions 77 are adapted to abut the tank wall when the closed U portion is engaged around the tube 53. Preferably a curved strip of spring steel 78 is interposed between the closed portion 76 of the strip and the web 13 of the channel housing for urging the conductor strip 75 toward the tank, the lower end of the spring 78 being secured to the web 13 and the upper end engaging the closed portion 76 of strip 75, as best shown in Fig. 2.

Thus the wings 77 are held in abutment with the tank wall 10 while the inner edges of housing channel legs 12 may be spaced slightly away from the tank, as in Fig. 4. Preferably suitable heat insulating material 80 is inserted within the channel housing 11 and around the conductor strip 75 to insulate the channel housing from the tank and strip 75 while the heat from the tank is being conducted by the conductor strip to the expansible tube 53.

The length of the expansible brass tube 53 is calibrated so that when the tank wall 10 is heated by the water therein to a temperature of approximately 150° F., the expansion of the tube relative to the non-expansible carbon rod will have the effect of raising the button 56 and allow the pin 59 to move upwardly which permits the spiral spring 45 to close the valve 42, thus closing off the supply of gas through the tube 51 to the main burner. When the temperature of the water drops slightly, the contraction of the tube 53 will cause the lower end of the carbon rod 54 to press downwardly on the lever 57 to force the pin 59 downwardly and open the valve 42 against the spring 45.

Since the tube 54 is made of brass, which has a relatively high coefficient of expansion, and the brass tube is of substantial length, a substantial differential of expansion is obtained for a temperature change of only two or three degrees. This differential of longitudinal expansion of the tube is multiplied in the approximate ratio of 2 to 1 by the lever 57 so that a material amount of opening movement is obtained at the valve 42. Consequently, the valve 42 may have a relatively small diameter, because the amount of its opening movement is such as to pass a relatively large amount of gas through the valve when it is open.

If the expansible tube 53 and carbon rod 54 are calibrated to operate the valve 42 to maintain the temperature of the water in the tank at 150° F., the indicator 66 is attached to the head 67 so as to be positioned at the center of the scale on bracket 71 when that temperature is being maintained. If it is desired to adjust the control device for operating the valve at a slightly higher or lower temperature, the indicator is moved toward the H or C end of the scale respectively. Moving the indicator toward the H end will turn the screw 65 downwardly to force the adjusting pin 63 against the carbon rod 54 to extend its effective length slightly, thus requiring a slightly greater amount of expansion of tube 53 and a correspondingly slightly higher temperature of the water in the tank to close the valve 42.

The novel thermostatic control device is compact and inexpensive in construction, and is easy to install on the exterior of various types and sizes of hot water tanks and heaters because it does not require insertion of a thermostatic element into the tank. Moreover, since the expansible element is a brass tube located along the exterior of the tank, greater expansibility and greater accuracy of control within the critical temperature range is obtained. The device can be made large of brass bar stock and utilizes a small control valve to control a substantial volume of fuel.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful constructions, and reasonable mechanical equivalents thereof obvious to those skilled in the art, are set forth in the appended claims.

I claim:

1. A thermostatic control device for a tank heater, including a channel housing, means for securing said channel housing against the exterior of the heater tank with the open side of the channel adjacent the tank wall, an expansible brass tube within said channel housing, the lower end of said tube being connected to a fuel valve housing within said channel housing, a U-shaped conductor strip fitting around said expansible tube and abutting said tank wall, spring means between said channel housing and conductor strip for holding said strip in abutment with said tank wall, a spring pressed control valve in said fuel valve housing, and a non-expansible rod slidable in said expansible tube and operatively connected to said control valve.

2. A thermostatic control device for a tank heater, including a channel housing, means for securing said channel housing against the exterior of the heater tank with the open side of the channel adjacent the tank wall, an expansible brass tube within said channel housing, the lower end of said tube being connected to a fuel valve housing within said channel housing, a U-shaped conductor strip fitting around said expansible tube and abutting said tank wall, spring means between said channel housing and conductor strip for holding said strip in abutment with said tank wall, a spring pressed control valve in said fuel valve housing, a non-expansible rod slidable in said expansible tube and operatively connected to said control valve, and adjustable means on the upper end of said expansible tube for abutting said non-expansible rod to vary its effective length.

HARRY H. EVERHARD.

REFERENCES CITED

The following references are of record in the file of this patent:

UNITED STATES PATENTS

| Number | Name | Date |
| --- | --- | --- |
| 308,955 | Eastman | Dec. 9, 1884 |
| 986,760 | Robertshaw | Mar. 14, 1911 |
| 1,732,565 | McCaw | Oct. 22, 1929 |
| 1,794,531 | Newell | Mar. 3, 1931 |
| 2,044,397 | Persons | June 16, 1936 |
| 2,057,496 | Lumsden | Oct. 13, 1936 |
| 2,115,431 | Shively | Apr. 26, 1938 |
| 2,157,296 | Mantz | May 9, 1939 |